United States Patent
Venugopal

(10) Patent No.: US 7,996,818 B1
(45) Date of Patent: Aug. 9, 2011

(54) METHOD FOR TESTING USING CLIENT SPECIFIED REFERENCES

(75) Inventor: Jeyandran Venugopal, Bangalore (IN)

(73) Assignee: Amazon Technologies, Inc., Reno, NV (US)

( * ) Notice: Subject to any disclaimer, the term of this patent is extended or adjusted under 35 U.S.C. 154(b) by 1165 days.

(21) Appl. No.: 11/694,660

(22) Filed: Mar. 30, 2007

Related U.S. Application Data

(60) Provisional application No. 60/882,842, filed on Dec. 29, 2006.

(51) Int. Cl.
*G06F 9/44* (2006.01)
(52) U.S. Cl. ....................................................... 717/124
(58) Field of Classification Search .................. 717/124, 717/126

See application file for complete search history.

(56) References Cited

U.S. PATENT DOCUMENTS

| | | | |
|---|---|---|---|
| 6,226,749 B1 * | 5/2001 | Carloganu et al. ............... | 726/2 |
| 2002/0152179 A1 * | 10/2002 | Racov ............................. | 705/67 |
| 2004/0162732 A1 * | 8/2004 | Rahim et al. .................... | 705/1 |
| 2006/0235796 A1 * | 10/2006 | Johnson et al. ................. | 705/44 |
| 2007/0025342 A1 * | 2/2007 | Obata ............................ | 370/352 |
| 2007/0101215 A1 * | 5/2007 | Holmqvist ..................... | 714/724 |
| 2007/0168744 A1 * | 7/2007 | Pal et al. ......................... | 714/38 |
| 2008/0010561 A1 * | 1/2008 | Bay et al. ....................... | 714/49 |
| 2008/0178299 A1 * | 7/2008 | Merkle et al. .................. | 726/29 |

\* cited by examiner

*Primary Examiner* — Anna Deng
(74) *Attorney, Agent, or Firm* — Lee & Hayes, PLLC

(57) ABSTRACT

A method for testing interactions between a server and a client computer is provided in which a client computer transmits a unique request identification (ID) and a unique response to a server computer. The unique request identification ID indicates actual production commands, and the unique response code indicates responses to be provided by the server computer. With a valid request ID, the server simulates its behavior as defined by the response code, and responds to the client computer pursuant to the behavior. Upon receiving an invalid request ID, the server responds to the client computer with an error code so that the client can correct the unique request ID.

14 Claims, 4 Drawing Sheets

METHOD FOR TESTING USING CLIENT SPECIFIED REFERENCES

CROSS REFERENCE TO RELATED MATTERS

This application claims benefit of U.S. provisional application No. 60/882,842 filed on Dec. 29, 2006.

BACKGROUND

Electronic based transactions for goods and services may be typically instantiated using a website. The website may operate on a client, such as a client computer, and in addition to being connected to the Internet, may communicate with a server, such as a server computer. The web site may display different goods and services and the server may be used to complete financial transactions or process a goods and/or services order. The website may access the server using an application program interface (API) provided by the server.

When a client computer adds new functionality it is important that the communication between the client computer and the server be tested with the new functionality. Testing of a client computer may be conducted by the client computer connecting to the server, and the client computer sending to the server computer dummy or test transactions using the API. The server may simulate those transactions and provide dummy responses while offline. In this manner, the interaction between the client and the server can be verified before the client and server are placed into production.

New features or functionality are typically added to the client and server. In order to test the interaction between the server and the client, the server must be upgraded and the API expanded to accommodate the new features and functions. Adding this new functionality requires that the new functionality be debugged on both the client and the server. Debugging the simulation adds to the development time and must be performed before the testing of the client/server interaction can be conducted. Consequently the time period before a web site can go live with new features and functionality may be extended.

SUMMARY

A method for conducting testing between a client computer and a server, such as a server computer, is provided that includes enhanced testing functionality designed to reduce development time to implement new features and functionalities.

In an exemplary embodiment, a client computer sends a unique request identification and a unique response code to a server. The server determines whether or not the request identification is valid. If the request is not valid, the server transmits an error message to the client computer so that client computer can correct errors in the request identification. If the request is valid, the server determines a behavior to simulate from the unique response code. The server then sends a response to the client computer as a result of the simulated behavior. By providing the response code to the server that specifies a behavior, the server is easily and quickly adapted to provide a response to the client computer for new functionality without time consuming debugging of the simulation process.

In another exemplary embodiment, a client computer transmits the unique request identification and a unique response code to a server computer. The unique request identification describes actual production commands, and the unique response code specifies responses to be provided by the server computer. The client computer then receives a response from the sever computer in accordance with the indicated response so that the client can verify its interaction with the server. Or the client, upon an indication of an error in the unique request identification, notes that an error has been received and corrects the unique request identification.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This application is directed to a method for conducting testing a between a client computer and a server, and for testing a client computer when it interacts with the server. In an exemplary embodiment, a client computer sends a unique request identification code and a unique response code to a server. The server determines whether or not the request identification code is valid. If the request is not valid, the server transmits an error message to the client computer so that client computer can then correct error in a format of the request identification code. If the request is valid, the server simulates a behavior indicated by the unique response code. The server then sends a response to the client computer as a result of the simulated behavior so that client computer can verify interaction with the server computer.

Example System Architecture

Figure 1:
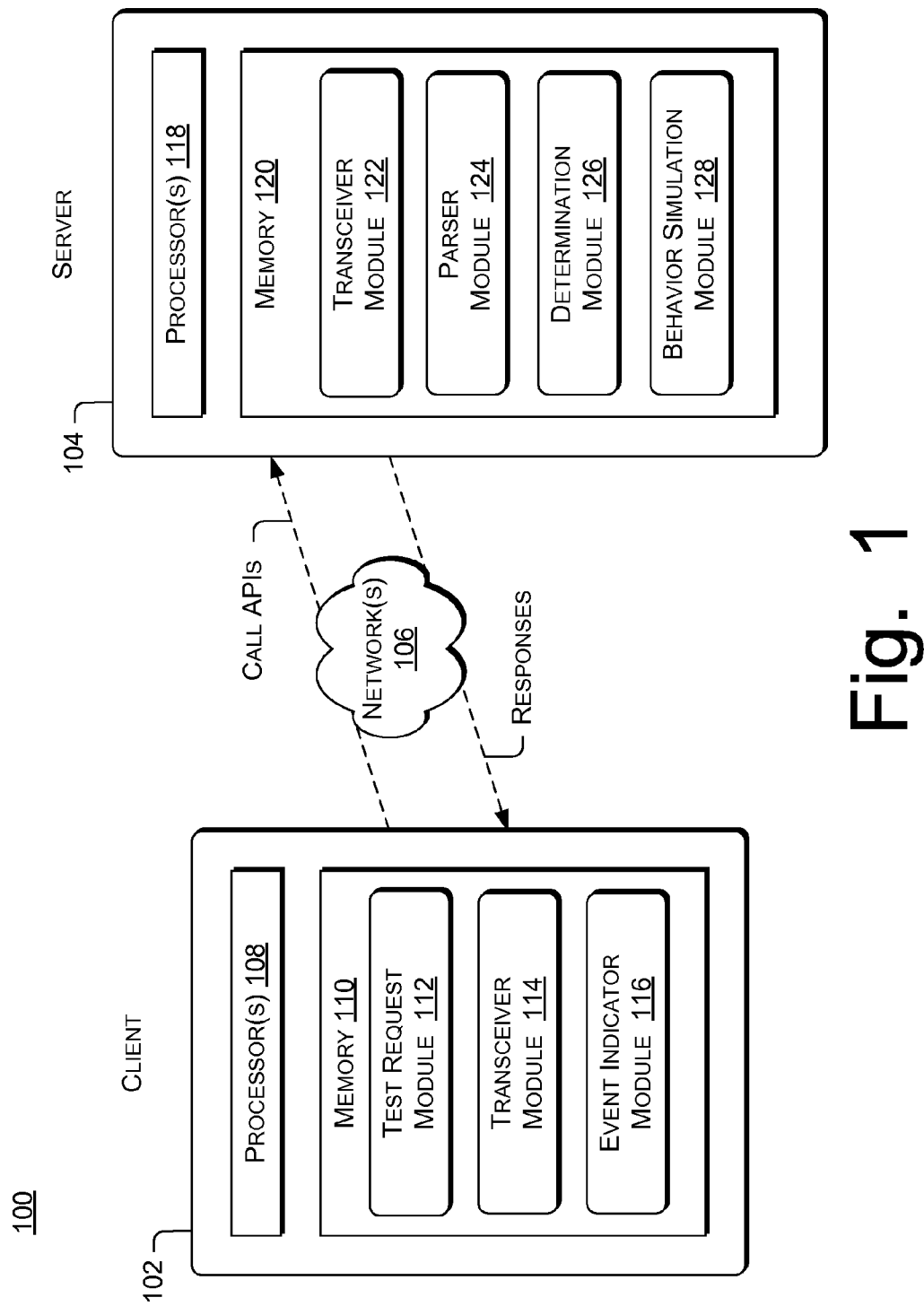
FIG. 1 illustrates an example architecture in which testing of the interaction between a client and a server is implemented.

FIG. 1 illustrates an example architecture 100 in which testing of the interaction between a client and a server is implemented. In system 100, the client 102 accesses a server 104 via one or more networks 106. The one or more networks 106 are representative of any one or combination of multiple different types of networks, such as cable networks, the Internet, and wireless networks.

In addition, FIG. 1 illustrates an example implementation of certain components of a client 102 used to call application program interfaces (APIs) on the server 106. The client 102 has process capabilities and memory suitable to store and execute computer-executable instructions. In this example, the server 102 includes one or more processors 108 and client memory 110. Client memory 110 includes volatile and non-volatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which is used to store the desired information and which can be accessed by a computer system.

Stored in client memory 110 are modules 112-116. The modules are implemented as software or computer-executable instructions that are executed by one or more processors 108. The test request module 112 is configured to generate requests, also known as call APIs, on the server 104. Each request contains a test parameter, which in turn includes unique request identification and a corresponding unique response code. The transceiver module 114 is responsible for communication with the server 104. Specifically, in one implementation, the transceiver module 114 is configured to transmit the one or more test parameters to the server 104, as well as receive responses that correspond to the one or more test parameters from the server 104. In addition, the event indicator module 116 is employed to indicate a response from the server 104.

FIG. 1 further illustrates an example implementation of certain components of a server 104 used to process client specific references from the client 102. The server 104 has process capabilities and memory suitable to store and execute computer-executable instructions. In this example, the server 104 includes one or more processors 118 and server memory 120. The server memory 120 includes volatile and nonvolatile memory, removable and non-removable media implemented in any method or technology for storage of information, such as computer-readable instructions, data structures, program modules or other data. Such server memory 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in server memory 120 are modules 122-128. The modules are implemented as software or computer-executable instructions that are executed by one or more processors 118. The transceiver module 122 is responsible for communication with the client 102. Specifically, in one implementation, the transceiver module 122 is configured to receive one or more test parameters form the client 102. The parser module 124 is configured to parse out the unique identification and the corresponding unique response identification from a test parameter received from client 102. The determination module 126 is employed to determine if a request identification is valid. The determination module 126 is further configured to generate a response for transmission by the transceiver module 122 to the client 102. Lastly, the behavior simulation module 128 is employed to simulate a behavior on the server 104 and then to generate a response according to the simulated behavior. The generated response is then transmitted by the transceiver module 122 to the client 102. In another implementation, the behavior simulation module 128 is further employed to obtain one or more prior simulations, and generate a response based on one or more prior simulations. This generated response is also then transmitted by the transceiver module 122 to the client 102.

Figure 2:
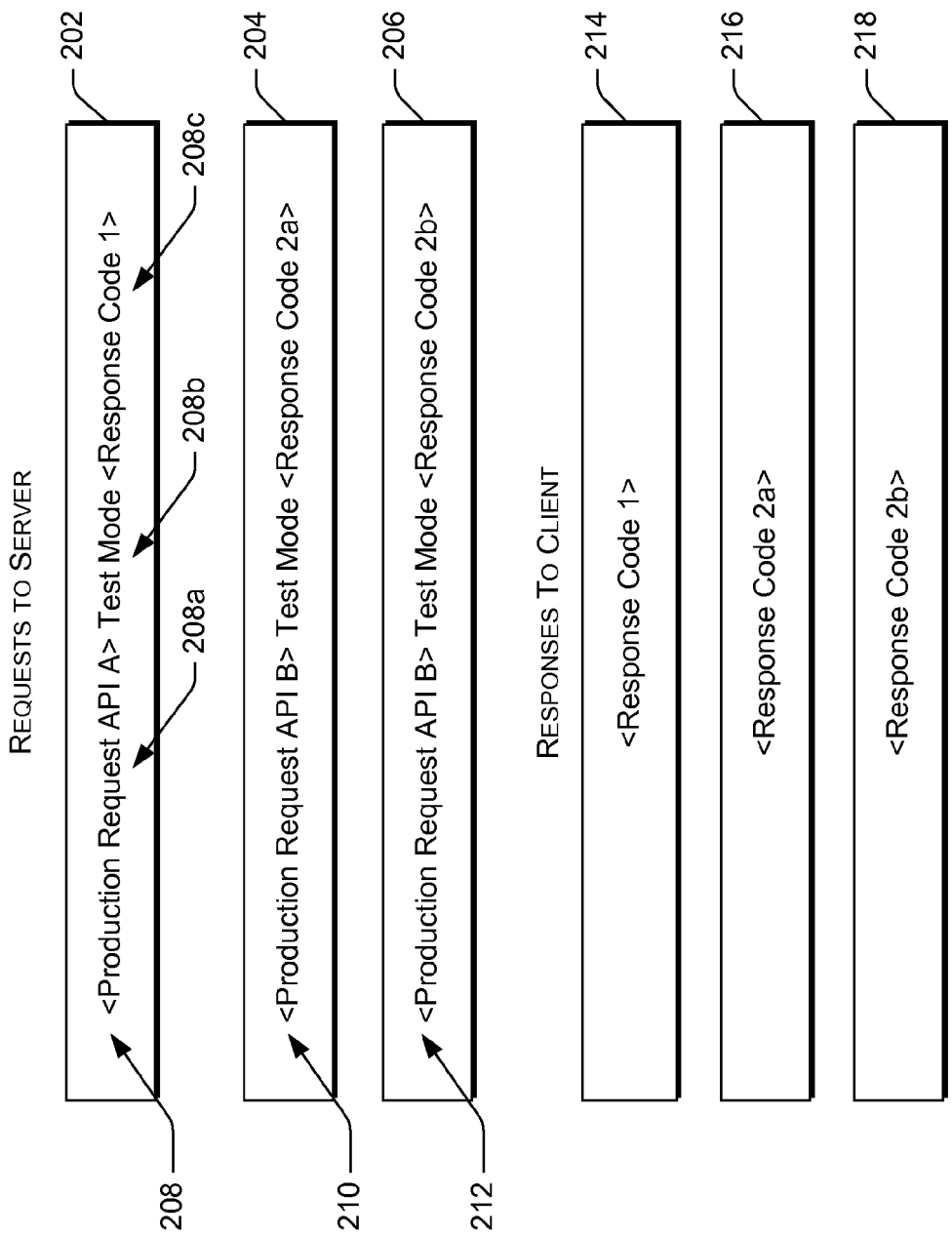
FIG. 2 illustrates data being transferred in an exemplary application program interface call from a client to a server, and exemplary responses from the server to the client, during client-server interaction testing.

FIG. 2 illustrates exemplary API call from a client 102 to a server 104, and exemplary responses from the server 104 to the client 102, during client-server interaction testing in response to the call. As discussed previously, each of the API calls 202-106, or requests, respectively contains unique test parameters 208-212. As illustrated in FIG. 2, each test parameter contains at least three components. For example, test parameter 208 has a first component 208a that is the unique request identification for the request 202. Furthermore, the test parameter 208 also includes a second component 208b that indicates the mode of the server 104. In this implementation, the second 208b indicates that the server 104 is in "test mode". Additionally, the test parameter 108 also comprises a third component 208c. Component 208c provides the expected response code for the server 104.

FIG. 2 also illustrates the exemplary responses 214-218 from the server 104 to the client 102. Exemplary response 214-218 is respectively generated by the server 104 in response to the exemplary API calls 202-206. As illustrated in FIG. 2, each of the responses 214-218 returns a response code that matches the expected response code contained in each of the API calls 202-206.

Figure 3A:
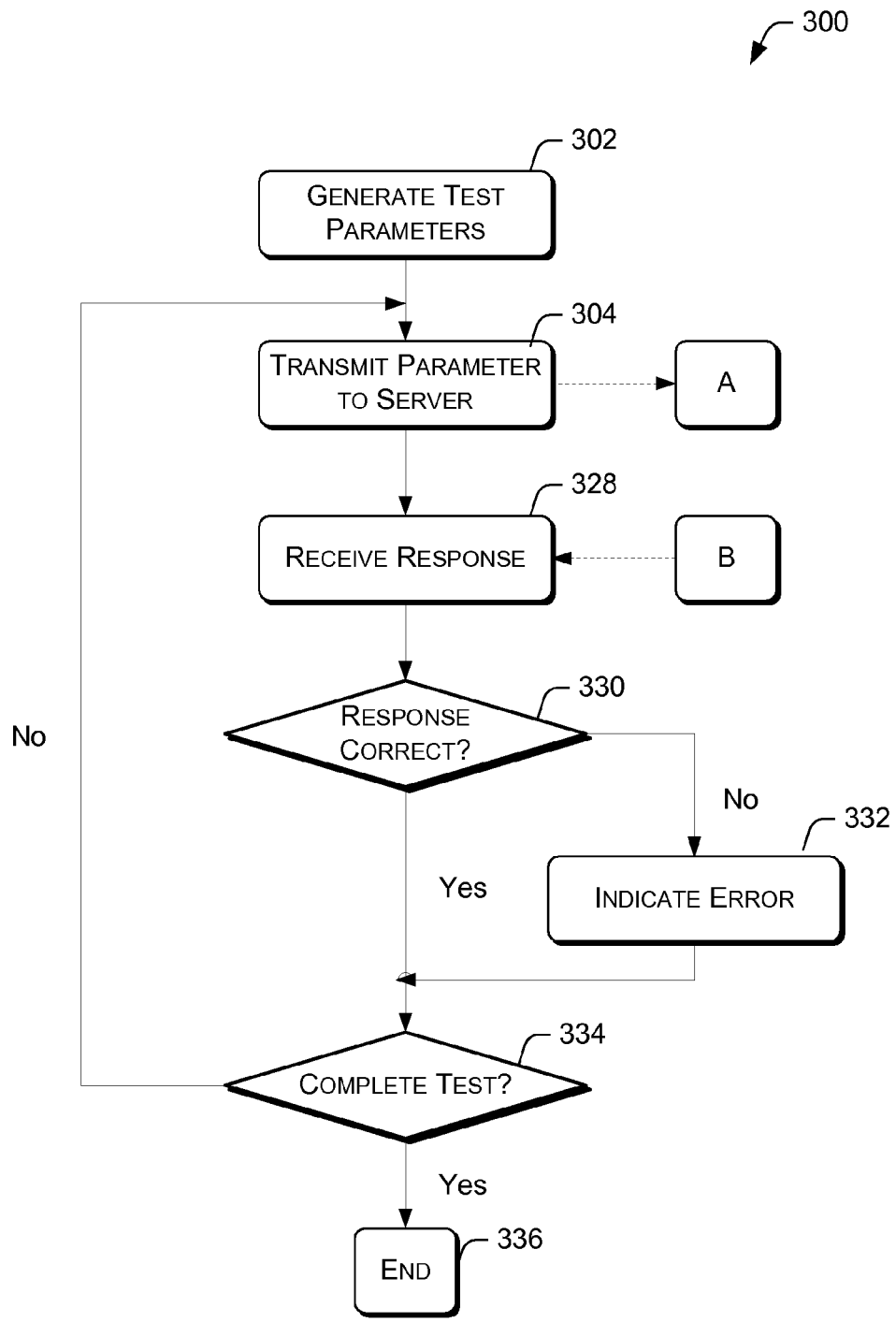
FIGS. 3a and 3b illustrates a flow diagram of an exemplary process for implementing a client-server interaction test between the client and the server shown in FIG. 1.
Figure 3B:
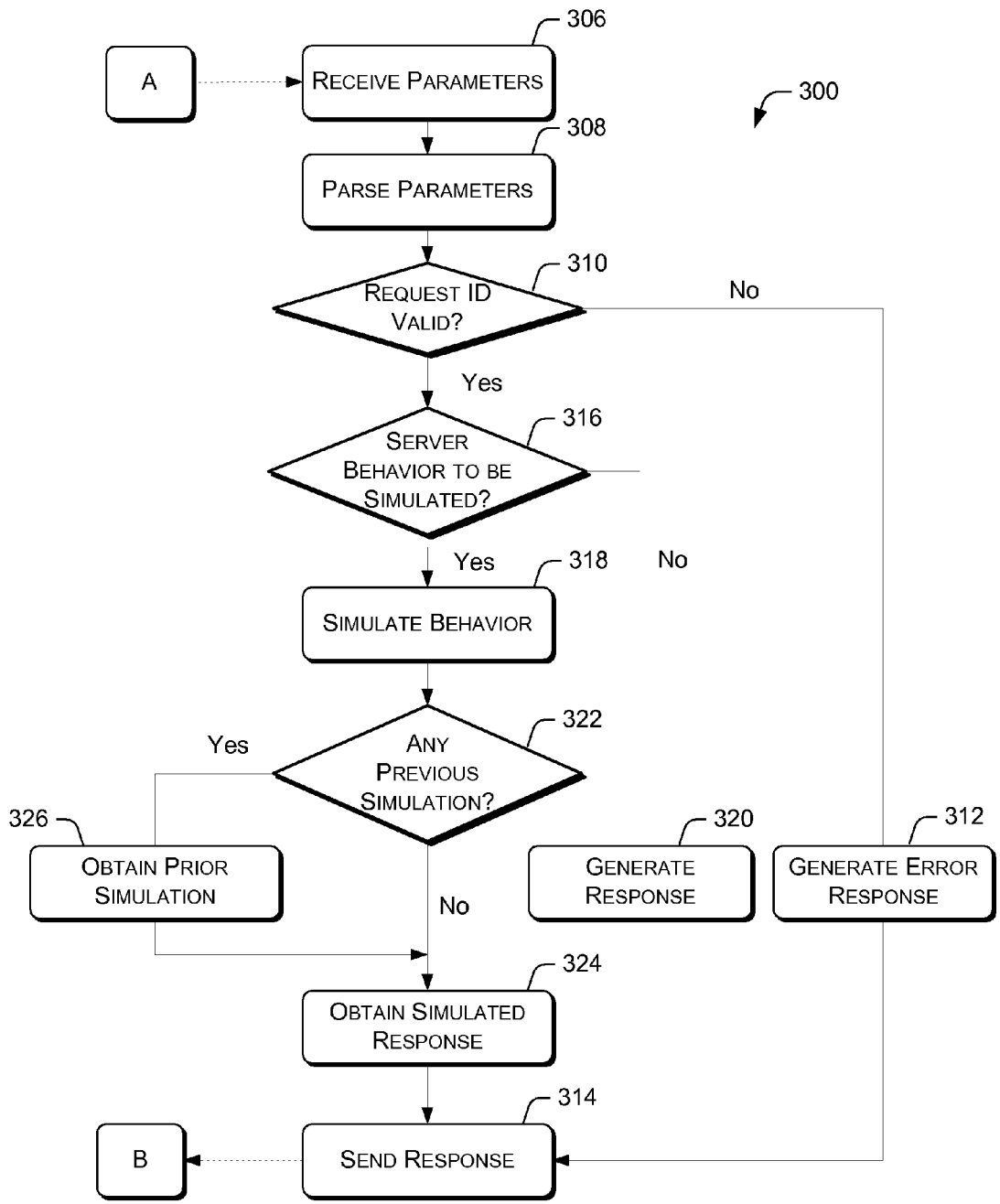

FIGS. 3a and 3b illustrates a flow diagram of an exemplary process 300 for a client-server interaction test on the client and the server shown in FIG. 1. Exemplary process 300 is illustrated as a collection of blocks in a logical flow diagram, which represents a sequence of operations that are implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the architecture 100 of FIG. 1, although it may be implemented in other system architectures.

At block 302, a client server 102 generates a test parameter using the test request generator module 114. The test parameter includes a unique request identification and an expected response code. At block 302, the client 102 employs the transceiver module 112 to transmit the test parameter in the form of a call API, or request, to the server 104 via one or more network 106. At block 306, a server 104 receives the call API containing the test parameter using transceiver module 122. At block 308, the parser module 124 parses out the unique request identification and the expected response code from the test parameter. At decision block 310, the determination module 126 makes a decision as to the whether the request identification is valid. If the request identification is invalid, ("no" to decision block 310), the process 300 proceeds to block 312. At block 312, the determination module generates an error response. At block 314, the transceiver module 122 sends the response to the client 102.

However, if the request identification is determined to be valid, ("yes" to decision block 310), the process 300 proceeds to decision block 316. At decision block 316, the behavior simulation module 128 determines, based on the response code parsed from the test parameter, whether server behavior needs to be simulated. If server response does not need to be simulated, the process proceeds to block 320. At block 320, the determination module 126 generates a response, and process 300 then proceeds to block 314 where transceiver module 122 sends the response to the client 102.

Nevertheless, if the behavior simulation module 128 determines at block 316 that server behavior needs to be simulated, the process proceeds to block 318. At block 318, the behavior simulation module simulates the behavior and generates a response. For example, if the response code parsed out from the test parameter indicates that the API is a "move money from customer A to customer B" request, and the desired response code is success, the server then simulates the transfer of the funds from customer A to customer B, and generates a response to indicate that the simulation was successful.

At decision block 322, the behavior simulation module 128 also determines whether it has performed any previous simulations. If the behavior simulation module 128 determines that no previous simulations were performed, ("no" to decision block 322), the behavior simulation module 128 then proceeds directly to block 324, where it obtains the generated response. At block 314, transceiver module 122 sends the generated response to the client 102.

Returning to decision block 322, if the behavior simulation module 128 determines that there are one or more previous simulations ("yes" to decision block 322), the behavior simulation module 128 then proceeds to block 326. At block 326, the behavior simulation module 128 obtains the one or more prior simulations, generates a response, and then advances to block 324. At block 324, the behavior simulation module 128 obtains the generated response before proceeding to block 314, where once again transceiver module 122 sends the response to the client 102.

At block 328, transceiver module 114 of the client 102 receives the response transmitted by transceiver module 122 of the server 104. At decision block 330, the event indicator module 114 determines whether the response is correct, that is, corresponds to the expected response of the test parameter transmitted to the server 104. If the event indicator 114 determines at decision block 330 that the response is incorrect, ("no" to decision block 330), the event indicator module indicate that an error is present at block 332 with an error code. However, if the event indicator 114 determines at decision block 332 that the response is correct, ("yes" to decision block 330), the process then advances to block 334. At decision block 334, the test request module 114 determines whether the test is complete. If the test is complete, the process terminates at block 336. If the test is determined to be not complete at decision block 334, the process then loops back to block 304 until the test is complete, that is, all test parameters have been transmitted to the server 104 and the corresponding responses obtained.

Conclusion

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for testing a client computing device using a server, the method comprising:
    receiving from the client computing device a test parameter that includes a unique request identification (ID) and a unique response code;
    parsing the unique response code to determine whether the unique request ID is valid;
    determining a server behavior in accordance with the unique response code and based at least in part on one or more previous simulations performed by the server;
    responding to the client computing device pursuant to the behavior if the unique request ID is determined to be valid, the responding including providing a response based at least in part on the simulating of the behavior; and
    responding to the client computing device with an error code if the unique request ID is not determined to be valid.

2. The method as recited in claim 1, further comprising simulating a behavior in the server in accordance with the unique response code.

3. The method as recited in claim 2, further comprising:
    receiving an additional unique request ID and an additional unique response code from the client computing device;
    determining additional server behavior in accordance with the additional unique response code; and
    providing an additional response in accordance with the simulated behavior and the additional unique response code.

4. The method as recited in claim 1, wherein the server receives a plurality of the unique request IDs and unique response codes.

5. A method, comprising:
    transmitting a test parameter that includes a unique request identification (ID) and a unique response code to a server computer, the unique request ID indicating actual production commands, and the unique response code indicating a response to be provided by the server computer and being parsed to determine whether the unique request ID is valid;
    receiving a response by the sever computer in accordance with the indicated response if the unique request ID is determined to be valid, the response being based at least in part on a simulated server computer behavior determined from the unique response code;
    receiving an indication of an error if the unique request ID is not determined to be valid, the indicated response or the indication of the error being based at least in part on one or more previous simulations performed by the server computer; and
    indicating an error if the indication of the error is received.

6. The method as recited in claim 5, wherein the unique response code indicates the behavior to be simulated by the server computer, and wherein the response by the server is received in accordance with the simulated server computer behavior.

7. The method as recited in claim 5, further comprising transmitting an additional unique request ID and an additional unique response code for each of a plurality of integration paths to be tested between a client computer and the server computer.

8. A method comprising:
    (a) receiving, from a client computer and by a server computer, a test parameter that includes a unique request identification (ID) and a unique response code, the unique request ID indicating actual production commands, and the unique response code indicating responses to be provided by the server computer;
    (b) determining whether one or more previous simulations have been performed by the server computer;
    (c) parsing, with the server computer, the unique response code to determine whether the unique request ID is valid based at least in part on the one or more previous simulations when previous simulations have been performed by the server computer;
    (d) if the unique request ID is valid, determining and simulating a server computer behavior in accordance with the unique response code and responding to the client computer with a response pursuant to the simulating of the server computer behavior;
    (e) if the request is invalid, responding to the client computer with an error code.

9. The method as recited in claim 8, wherein additional functionality is added to the client computer and steps (a)-(e) are performed after adding the additional functionality.

10. The method as recited in claim 8, further comprising:
    receiving an additional unique request ID and an additional unique response code at the server computer;

determining additional server computer behavior in accordance with the additional unique response code; and providing an additional response by the server computer in accordance with the simulated behavior and the additional unique response code.

11. A computer readable medium comprising computer-executable instructions that, when executed by one or more processors, perform acts comprising:

transmitting a test parameter that includes a unique request identification (ID) and a unique response code to a server computer, the unique request ID indicating production commands, and the unique response code indicating a response to be provided by the server computer and being parsed to determine whether the unique request ID is valid;

receiving a response by the server computer in accordance with the indicated response if the unique request ID is determined to be valid, the response being based at least in part on a simulated server computer behavior determined from the unique response code;

receiving an indication of an error if the unique request ID is not determined to be valid, the response by the server computer being based at least in part on one or more previous simulations performed by the server computer; and indicating an error if the indication of the error is received.

12. The computer readable medium as recited in claim 11, wherein indicating the error includes transmitting a signal to a client computer via a network.

13. The method as recited in claim 8, wherein:

the response is received by the client computer; and the client computer indicates an error when an indication of an error is received from the server computer.

14. The method as recited in claim 8, wherein the server computer comprises a set of multiple server computers.

* * * * *